US010310122B2

(12) United States Patent
Haacke et al.

(10) Patent No.: US 10,310,122 B2
(45) Date of Patent: *Jun. 4, 2019

(54) INCREASING SIMILARITY BETWEEN SEISMIC DATASETS

(71) Applicant: CGG SERVICES SA, Massy (FR)

(72) Inventors: Ross Haacke, Surrey (GB); Lorenzo Casasanta, Calgary (CA); Benoit De Cacqueray, Clamart (FR)

(73) Assignee: CGG SERVICES SAS, Massy (FR)

( * ) Notice: Subject to any disclaimer, the term of this patent is extended or adjusted under 35 U.S.C. 154(b) by 596 days.

This patent is subject to a terminal disclaimer.

(21) Appl. No.: 14/957,949

(22) Filed: Dec. 3, 2015

(65) Prior Publication Data
US 2016/0091624 A1    Mar. 31, 2016

Related U.S. Application Data

(63) Continuation-in-part of application No. 13/784,112, filed on Mar. 4, 2013, now Pat. No. 9,229,122.

(60) Provisional application No. 62/088,107, filed on Dec. 5, 2014, provisional application No. 62/145,519, filed on Apr. 10, 2015.

(51) Int. Cl.
*G01V 1/36* (2006.01)
*G01V 1/32* (2006.01)
*G01V 1/30* (2006.01)

(52) U.S. Cl.
CPC ............ *G01V 1/366* (2013.01); *G01V 1/308* (2013.01); *G01V 2210/51* (2013.01); *G01V 2210/612* (2013.01)

(58) Field of Classification Search
CPC .... G01V 1/308; G01V 1/366; G01V 2210/51; G01V 2210/612
USPC ............................................... 367/38; 702/16
See application file for complete search history.

(56) References Cited

U.S. PATENT DOCUMENTS 4,800,539 A * 1/1989 Corn ...................... G01V 1/306
                                                         367/68
4,882,713 A * 11/1989 Hughes ................. G01V 1/362
                                                         367/47

(Continued)

OTHER PUBLICATIONS

Girard et al., "Image-domain time-lapse inversion with extended images," SEG Denver Annual Meeting, 2010, pp. 4200-4204. (Year: 2010).*

(Continued)

*Primary Examiner* — Daniel L Murphy
(74) *Attorney, Agent, or Firm* — Patent Portfolio Builders PLLC

(57) ABSTRACT

A method for increasing similarity between a first seismic dataset and a second seismic dataset from at least one seismic survey of a subsurface. The first and second seismic datasets are migrated to a dip angle image domain. The migrated first and second seismic datasets are used in the dip angle image domain to calculate a set of decimating weights to be applied to the first seismic dataset and the second seismic dataset to maximize a similarity between the first seismic dataset and the second seismic dataset. The decimated weights are applied to the first and second seismic datasets, and an image of the subsurface is generated using the first seismic dataset and the second seismic dataset following application of the decimated weights.

19 Claims, 8 Drawing Sheets

(56) References Cited

U.S. PATENT DOCUMENTS

| | | | |
|---|---|---|---|
| 6,438,069 B1* | 8/2002 | Ross | G01V 1/288 367/46 |
| 8,339,898 B2* | 12/2012 | Smith | G01V 1/28 367/38 |
| 9,229,122 B2* | 1/2016 | Haacke | G01V 1/366 |
| 2004/0068377 A1 | 4/2004 | Charron | |
| 2008/0170468 A1* | 7/2008 | Brain | G01V 1/30 367/38 |
| 2014/0247693 A1 | 9/2014 | Haacke | |
| 2014/0293744 A1* | 10/2014 | Zhang | G01V 1/28 367/53 |

OTHER PUBLICATIONS

Perrone et al. ("Shot-domain 4D time-lapse velocity analysis using apparent image displacements," from SEG Technical Program Expanded Abstracts, 2013, 6 pp. (Year: 2013).*

A. Understanding, et al.; "Onshore 4D processing: Niger Delta example: Kolo Creek Case study"; SEG Technical Program Expanded Abstracts 2011; Jan. 1, 2011; XP055373190; pp. 4175-4178.

European Search Report in corresponding European Application No. EP 14 15 7464 dated May 16, 2017.

S. A. Hall, et al.; "Cross-matching with interpreted warping of 3D streamer and 3D ocean-bottom-cable data at Valhall for time-lapse assessment"; Geophysical Prospecting, vol. 53, No. 2; XP055373461; Mar. 1, 2005; pp. 283-297.

Rodney Calvert, "Insights and Methods for 4D Reservoir Monitoring and Characterization", Distinguished Instructor Short Course, Series No. 8, Society of Exploration Geophysicists, European Association of Geoscientists & Engineers, 2005.

P.J. Smith et al., "Simultaneous time-lapse Binning and Regularization of 4D Data", 74th EAGE Conference & Exhibition incorporating SPE EUROPEC 2012, Copenhagen, Denmark, Jun. 4-7, 2012.

E. Zabihi Naeini et al., "Simultaneous Multi-vintage 4D Binning", 71st EAGE Conference & Exhibition, Amsterdam, The Netherlands, Jun. 8-11, 2009.

S.-K. Foss et al., "4D Angle Migration without Data Regularization", 73rd EAGE Conference & Exhibition Incorporating SPE EUROPEC 2011, Vienna, Austria, May 23-26, 2011.

Aaron Girard et al., "Image-domain Time-Lapse Inversion with Extended Images", SEG Denver 2010 Annual Meeting.

Francesco Perrone et al., "Shot-domain 4D Time-Lapse Velocity Analysis Using Apparent Image Displacements", 2013 SEG Annual Meeting, Sep. 22-27, Houston, Texas.

Francois Audebert, "Migration in the Angle Domain—An inside View", EAGE 65th Conference & Exhibition, Stavanger Norway Jun. 2-5, 2003.

Alexander Klokov et al., "Selecting an Optimal Aperture in Kirchhoff Migration Using Dip-Angle Images", Geophysics, vol. 78 No. 6, Nov.-Dec. 2013.

Moshe Reshef et al., "Post-stack Velocity Analysis in the Dip-angle Domain Using Diffractions", Geophysical Prospecting, vol. 57, Issue 5, pp. 811-821, Sep. 2009.

* cited by examiner

INCREASING SIMILARITY BETWEEN SEISMIC DATASETS

CROSS REFERENCE TO RELATED APPLICATIONS

This application is a continuation-in-part of co-pending U.S. patent application Ser. No. 13/784,112 filed Mar. 4, 2013 for "Image domain 4D-Binning Method and System". In addition, this application claims priority and benefit from U.S. Provisional Patent Application No. 62/088,107, filed Dec. 5, 2014, for "Dip-Angle Domain 4D Processing" and U.S. Provisional Patent Application No. 62/145,519, filed Apr. 10, 2015, for "Dip Filtering for 4D Monitoring". The entire contents of all of these applications are incorporated herein by reference.

TECHNICAL FIELD

Embodiments of the subject matter disclosed herein relate to methods and systems for processing 4-dimensional (4D) seismic data to image a subsurface area during reservoir production.

BACKGROUND

Evaluation of production from a subsurface reservoir utilizes four-dimensional (4D) processing of two seismic datasets obtained at two different times, e.g., two vintages, from a given subsurface region to determine changes in Earth properties resulting, for example, from petroleum reservoir production. The two seismic datasets can be obtained from land-based seismic surveys and marine-based seismic surveys. As the seismic surveys are conducted at different times, variations in the geometries of the two surveys exists, which complicates the comparison of the two seismic datasets. These variations in geometry occur in particular in marine-based seismic surveys.

Marine seismic data acquisition and processing generate an image of a geophysical structure, i.e., subsurface, under the seafloor. While this image does not provide a precise location for oil and gas reservoirs, it suggests, to those trained in the field, the presence or absence of oil and/or gas reservoirs. Thus, providing a high-resolution image of the subsurface is an ongoing process for the exploration of natural resources, including, among others, oil and/or gas.

During a seismic gathering process, as shown in FIG. 1, a vessel 10 tows an array of seismic receivers 11 located on streamers 12. The streamers may be disposed horizontally, i.e., lying at a constant depth relative to the ocean surface 14, or may have spatial arrangements other than horizontal, e.g., variable-depth arrangement. The vessel 10 also tows a seismic source array 16 configured to generate a seismic wave 18. The seismic wave 18 propagates downward, toward the seafloor 20, and penetrates the seafloor until, eventually, a reflecting structure 22 (reflector) reflects the seismic wave. The reflected seismic wave 24 propagates upward until it is detected by receiver 11 on streamer 12. Based on this data, an image of the subsurface is generated.

Alternatively, ocean bottom cables (OBC) or ocean bottom nodes (OBN) and ocean bottom seismometers (OBS) may be used to record the seismic data. FIG. 2 shows an OBC 30 that includes plural receivers 32 distributed on the ocean bottom 20, which may be connected to each other (or may be independent OBN/OBS) with a cable 33 that may also be connected to a data collection unit 34. Various means (e.g., underwater vehicle) may be used to retrieve the seismic data from the data collection unit 34 and bring it on the vessel 10 for processing.

When these marine-based survey techniques are used to monitor a producing reservoir the location of the streamers or nodes may vary between vintages. Variability in the two seismic datasets is also introduced when a first dataset is collected using one technique and the second dataset is collected using the other technique. As 4D processing determines changes in Earth properties by evaluating differences in seismic data acquired at different times but processed together, the success of 4D processing depends on how well differences in acquisition methods and geometries are handled during data processing and imaging.

If these differences are accurately compensated, changes in the subsurface that are related to fluid production can be identified by areas of significant difference between baseline and monitor images after migration. Failure to compensate for acquisition differences leads to the creation of 4D noise, which is an appreciable difference of baseline and monitor migrated images not attributable to reservoir production. Differences in both information content and wavefield sampling lead to this generation of 4D noise. Therefore, it is desirable to address acquisition differences through more accurate methods of data processing.

Accurate selection of subsets of seismic traces in the base and monitor seismic surveys reduces the level of 4D noise in the migrated images by choosing subsets of data that migrate to give the same image, free of the effects of acquisition differences and other sources of 4D noise, and giving a 4D image with a faithful representation of petroleum production activity. Conventional methods utilize 4D-binning to select traces from the base and monitor surveys for further processing based on a set of criteria that assess their degree of similarity. These conventional methods evaluate a set of similarity criteria in the data domain, i.e., before migration, and work well when the base and monitor surveys have similar acquisition geometry, for example, a towed-streamer base survey and a towed-streamer monitor survey acquired in similar positions but at different times. However, when the base and monitor surveys have different acquisition geometries, for example, a towed-streamer base survey and a sparse OBN monitor survey, the surface or data domain trace attributes used to measure similarity in the 4D-binning process are not a good proxy for similarity of the traces in the seismic datasets or for the wavefield sampling in the seismic datasets. Furthermore, the evaluation of similarity using surface or data domain trace attributes cannot accurately measure similarity of information content, since the grouping of traces by surface attributes does not allow the comparison of similar parts of the seismic wavefield.

Therefore, the need exists for improved methods and systems for improving the similarity between two seismic datasets even given changes in acquisition geometries, e.g., towed-streamer and ocean-bottom data. These improved systems and methods would be applicable to 4D processing for seismic datasets associated with multiple seismic survey vintages conducted at different times.

SUMMARY

Exemplary embodiments are directed to methods and systems that provide for the processing of two seismic datasets to improve the similarity of these seismic datasets. These seismic datasets can be associated with two separate seismic survey vintages, which are acquired at different times, usually before, i.e., the baseline survey, and after, i.e., the monitor survey, a period of fluid production from a petroleum reservoir. This multi-vintage processing is time-lapse or 4D processing of the two seismic datasets. Through 4D processing, changes in Earth properties of the subsurface being surveyed are identified by evaluating differences in the co-processed seismic datasets.

Processing of the two seismic datasets includes migrating the seismic data to the image domain from the data domain. In addition to migration to the image domain in general, the seismic datasets are migrated to dip-angle image domain, which is a sub-class of the more general image domain. In the dip-angle image domain, components of the migrated image are separated to a set of different partial images based on the reflector dip being imaged. Therefore, each partial image in the dip-angle image domain is associated with a reflector dip or dip angle. The number of partial images and the associated dip angles are selected using techniques including anti-aliasing techniques where the dip angles are associated with frequency bands and dip filtering where only a subset of the entire available dip angle range is used.

Each partial image is generated for each seismic dataset. The result is a set or pair of partial images for each dip angle. These pairs of partial images are then compared to identify similarities and also to calculate a decimation or weighting function that can be applied to each partial image in each pair of partial images to increase the similarity between the pairs of partial images. This is conducted in the dip angle image domain, and the weighting function can be an analogue or binary (0,1) system that decimates or reduces those parts of the partial images and seismic datasets. Having increased the similarity between pairs of weighted partial images, these partial images with improved similarity are then recombined to generate an image of the subsurface having reduced noise. This subsurface image can then be used to analyze changes in the subsurface attributable to reservoir production.

According to an exemplary embodiment, there is a method for increasing similarity between a base seismic survey and a monitor seismic survey of a same surveyed subsurface during a 4-dimensional (4D) project. The method includes receiving first seismic data associated with the base seismic survey; receiving second seismic data associated with the monitor seismic survey, wherein the monitor seismic survey is performed later in time than the base seismic survey; migrating the first and second seismic data to an image domain; and calculating, with a processor, a set of decimating weights based on the migrated first and second seismic data in the image domain, to maximize a similarity between the first seismic data and the second seismic data.

According to another exemplary embodiment, there is a computing device for increasing similarity between a base seismic survey and a monitor seismic survey of a same surveyed subsurface during a 4-dimensional (4D) project. The computing device includes an interface configured to receive first seismic data associated with the base seismic survey and second seismic data associated with the monitor seismic survey, wherein the monitor seismic survey is performed later in time than the base seismic survey; and a processor connected to the interface. The processor is configured to migrate the first and second seismic data to an image domain, and calculate a set of decimating weights based on the migrated first and second seismic data in the image domain, to maximize a similarity between the first seismic data and the second seismic data.

An embodiment is directed to a method for increasing similarity between a first seismic dataset and a second seismic dataset from at least one seismic survey of a subsurface. The first and second seismic datasets are obtained. In one embodiment, the first seismic dataset includes a plurality of first seismic traces obtained from a base seismic survey, and the second seismic dataset includes a plurality of second seismic traces obtained from a monitor seismic survey conducted after the base seismic survey.

The first seismic dataset and second seismic dataset are migrated to a dip angle image domain. In one embodiment, a subset of the first seismic traces and a subset of the second seismic traces are selected, and the subset of first seismic traces and the subset of second seismic traces are migrated. The migrated first seismic dataset and the migrated second seismic dataset are used in the dip angle image domain to calculate, with a processor, a set of decimating weights to be applied to the first seismic dataset and the second seismic dataset to maximize a similarity between the first seismic dataset and the second seismic dataset. In one embodiment, the set of decimating weights is calculated to be applied to the first seismic dataset and the second seismic dataset in the dip angle image domain. The decimated weights are applied to the first seismic dataset and the second seismic dataset, and an image of the subsurface is generated using the first seismic dataset and the second seismic dataset following application of the decimated weights.

In one embodiment, the first seismic dataset is migrated to a plurality of first seismic dataset dip angle partial images, and the second seismic dataset is migrated to a plurality of second seismic dataset dip angle partial images. Each first seismic dataset and second seismic dataset dip angle partial image is associated with one of a plurality of dip angles. A measure of similarity between a first seismic dataset dip angle partial image and a second seismic dataset dip angle partial image is determined for each pair of dip angle partial images associated with a common one of the plurality of dip angles. Preferably, the measure of similarity is a point by point measure of similarity.

A set of decimating weights is calculated for the first seismic dataset dip angle partial image and the second seismic dataset dip angle partial image in each pair of dip angle partial images. Each set of decimating weights when multiplied to the first seismic dataset dip angle partial image and the second seismic dataset dip angle partial image in a given pair of dip angle partial images increases a similarity of the first seismic dataset dip angle partial image and the second seismic dataset dip angle partial image in that given pair of dip angle partial images. Each set of decimating weights is multiplied to the first seismic dataset dip angle partial image and the second seismic dataset dip angle partial image in the pair of dip angle partial images associated with that set of decimating weights. The first seismic dataset dip angle partial image and the second seismic dataset dip angle partial image in each pair of dip angle partial images are combined following multiplication to produce an image of the subsurface.

In one embodiment, the plurality of dip angles are selected by identifying a plurality of frequency bands in the first and second seismic datasets and associating a dip angle with each one of the plurality of frequency bands. The lower frequencies are associated with larger dip angles, and the higher frequencies are associated with smaller dip angles. In one embodiment, the plurality of dip angles are selected by identifying a smallest dip angle, which is greater than zero, identifying a largest dip angle, which is less than a maximum dip angle in the subsurface and selecting the plurality of dip angles between the smallest dip angle and the largest dip angle.

An embodiment is directed to a computing device increasing similarity between a first seismic dataset and a second seismic dataset from at least one seismic survey of a subsurface. The computing device includes a database containing the first seismic dataset and the second seismic dataset. The computing device also includes a processor in communication with the database and configured to migrate the first seismic dataset and second seismic dataset to a dip angle image domain and use the migrated first seismic dataset and the migrated second seismic dataset in the dip angle image domain to calculate, with a processor, a set of decimating weights to be applied to the first seismic dataset and the second seismic dataset to maximize a similarity between the first seismic dataset and the second seismic dataset.

In one embodiment, the processor is further configured to migrate the first seismic dataset to a plurality of first seismic dataset dip angle partial images and the second seismic dataset to a plurality of second seismic dataset dip angle partial images. Each first seismic dataset and second seismic dataset dip angle partial image is associated with one of a plurality of dip angles. In one embodiment, the processor is further configured to determine a measure of similarity between a first seismic dataset dip angle partial image and a second seismic dataset dip angle partial image for each pair of dip angle partial images associated with a common one of the plurality of dip angles. The measure of similarity can be a point by point measure of similarity.

In one embodiment, the processor is further configured to calculate a set of decimating weights for the first seismic dataset dip angle partial image and the second seismic dataset dip angle partial image in each pair of dip angle partial images. Each set of decimating weights when multiplied to the first seismic dataset dip angle partial image and the second seismic dataset dip angle partial image in a given pair of dip angle partial images increases a similarity of the first seismic dataset dip angle partial image and the second seismic dataset dip angle partial image in that given pair of dip angle partial images.

In one embodiment, the processor is further configured to multiply each set of decimating weights to the first seismic dataset dip angle partial image and the second seismic dataset dip angle partial image in the pair of dip angle partial images associated with that set of decimating weights and combine the first seismic dataset dip angle partial image and the second seismic dataset dip angle partial image in each pair of dip angle partial images following multiplication to produce an image of the subsurface.

According to still another embodiment, there is a non-transitory computer readable medium including computer executable instructions, wherein the instructions, when executed by a computer, implement the methods discussed above.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to seismic data collected during a base survey and a monitor survey, wherein the base survey was conducted with streamers and the monitor survey was conducted with ocean bottom nodes (OBNs). However, the embodiments to be discussed next are not limited to these kinds of surveys. For example, the novel embodiments may be applied to a base survey conducted with OBNs and a monitor survey conducted with streamers or the baseline and monitor surveys may be different wavefields such as an upgoing wavefield and a downgoing wavefield. More generally, the novel embodiments are successful for base and monitor seismic surveys that may have different information content and/or wavefield sampling.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Exemplary embodiments are directed to methods and systems for matching two seismic datasets, i.e., a first seismic dataset and a second seismic dataset. In one embodiment, these seismic datasets represent two separate parts of a common seismic survey acquisition. Alternatively, these seismic datasets are associated with two separate vintages of seismic surveys, a base survey conducted at a first time and a monitor survey conducted at a second later time. The two seismic datasets are processed and matched using four-dimensional (4D) processing. This processing improves or increases the similarities between the two seismic datasets, reducing 4D noise and improving the use of these two seismic datasets to image changes over time in subsurface structures such as reservoirs that are attributable to reservoir production techniques.

Figure 1:
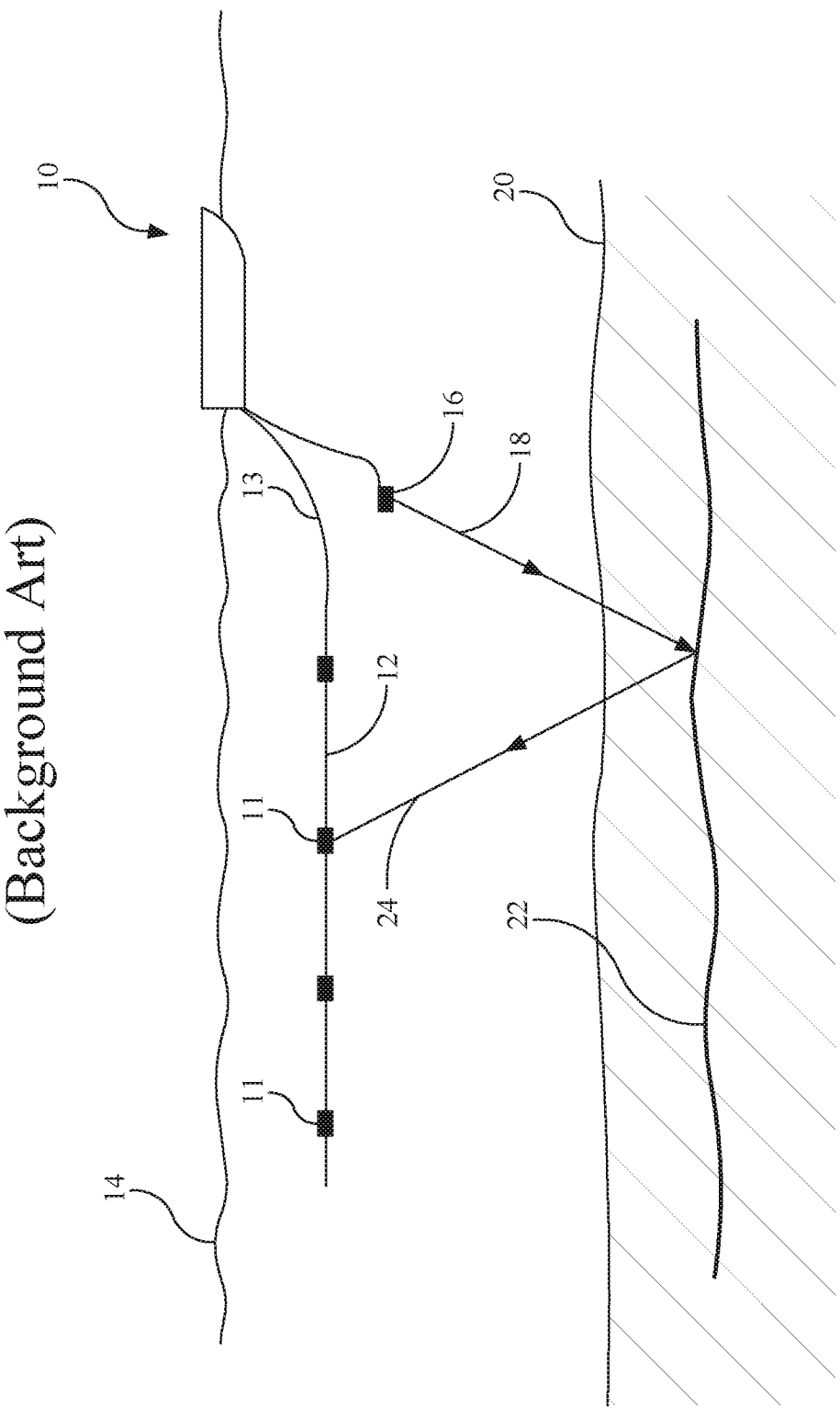
FIG. 1 is a schematic diagram of a conventional seismic data acquisition system having plural seismic receivers on streamers.
Figure 2:
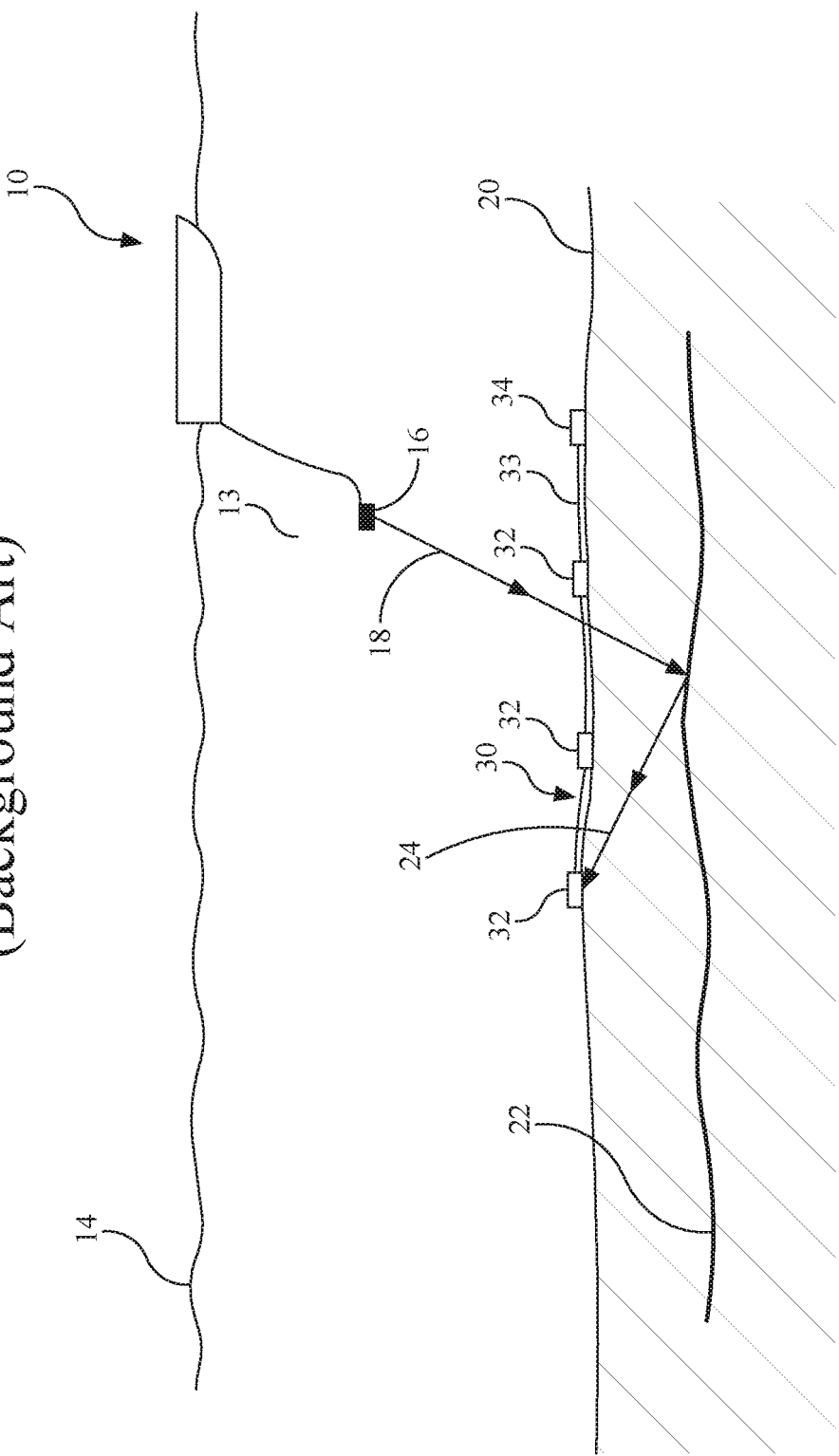
FIG. 2 is a schematic diagram of a conventional seismic data acquisition system having plural seismic receivers located at the ocean bottom.
Figure 3:
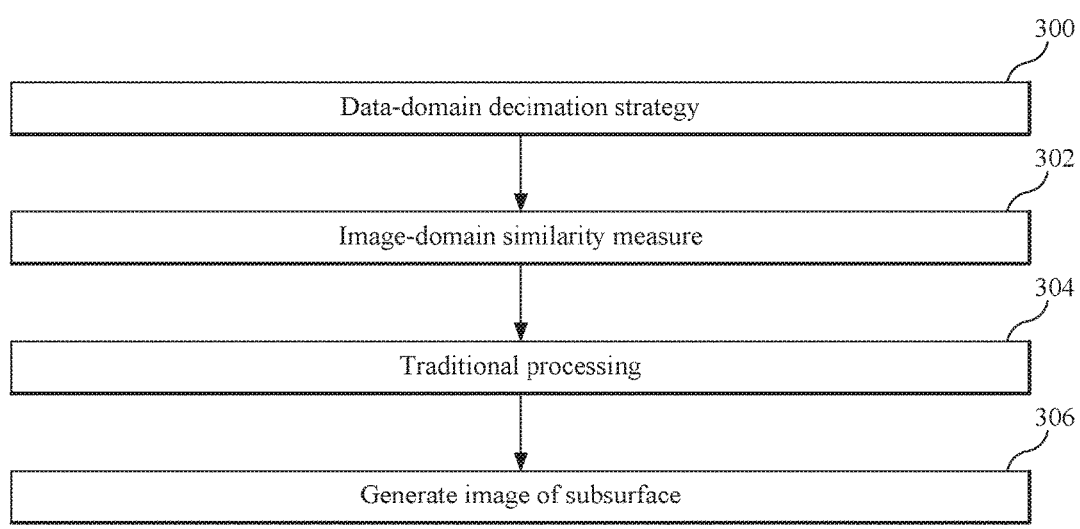
FIG. 3 is a flowchart illustrating a novel method for 4D-binning according to an exemplary embodiment.

Referring initially to FIG. 3, in one embodiment a first step of using a data domain decimation strategy 300 is linked to a second step of using an image domain similarity measure 302. This combination of (i) data domain decimation and (ii) image domain similarity measure is an improvement over the conventional use of data domain attributes in 4D-binning. Following decimation in the data domain and similarity determination in the image domain, traditional processing is applied in a third step 304. This traditional processing includes migration on the data binned according to the first and second steps 300 and 302. In the fourth step, a final image of the surveyed subsurface is generated 306.

As discussed above, measuring similarity between two seismic datasets based on data domain attributes cannot accurately match seismic traces obtained using different acquisition geometries. However, a more accurate match is obtained by evaluating the need for decimation of two seismic datasets in the common migrated-image domain and in particular in the dip angle image domain. This image domain similarity comparison and decimation determination is applicable in the 4D processing of both land and marine seismic acquisition systems, including towed-streamer and ocean-bottom node systems, in which the acquisition geometries vary.

In one embodiment, the subsurface image (I) of each one of a first seismic dataset and a second seismic dataset are used to calculate a set of decimating weights (w) that can be multiplied to the first and second seismic datasets to reduce these input datasets (d) to a common level of information and wavefield sampling. In one embodiment, the decimating weights are determined by requiring the first and second seismic datasets following decimation to be equal. This equality can be determined in a least-squares sense or any other equivalent minimizing norm when using sections of the input first and second datasets known to correspond to stationary parts of Earth. Alternatively, estimation of the decimation weights is conditioned by requiring the set of decimating weights to have a minimum gradient, which promotes similarity of weights for adjacent seismic traces, or to have a minimum total magnitude on the complementary set of weights, which maximizes the data that survive the process and prevents the trivial solution of all data being weighted to zero. As used herein, a complementary weight, $\tilde{w}$, is defined as $\tilde{w}=1-w$, for weight $w=[0,1]$. In one embodiment, the decimating weights are determined as a function that varies on a sample by sample, or trace by trace, basis. In another embodiment, no explicit grouping of seismic traces is used in the image domain 4D-binning method.

In accordance with one exemplary embodiment, a matrix A is defined that contains coefficients of a diffraction-stack migration, a Kirchhoff migration or any known migration in its rows. Suitable types of migrations are known and available in the art. The defined matrix, A, which can also be referred to as a transform, maps the seismic datasets d onto a migrated image $I_a$. The transform A models a propagation of the wavefields in the subsurface via ray-tracing through an arbitrary subsurface model. Coefficients in A's rows are placed such that multiplication of each row of A with the data vector d achieves the Kirchhoff integral for a particular image point. The image point is represented by the row of the image vector $I_a$. Subscript a on the image vector indicates an evaluation of the image at a specific ensemble of points in the image domain that do not have to be regularly distributed. If subscript b is used to indicate the baseline survey, migration of this dataset can be expressed as:

$$I_{a|b}=A_b d_b, \quad (1)$$

where the data vector $d_b$ is of dimensions (m×1), the image vector $I_{a|b}$ is of dimensions (p×1), and the migration matrix $A_b$ is of dimensions (p×m). Similarly, for the monitor (subscript m) the migration of the corresponding dataset can be written as:

$$I_{a|m}=A_m d_m, \quad (2)$$

where the data vector $d_m$ is now (n×1), the image vector $I_{a|m}$ is still (p×1), and the migration matrix $A_m$ is (p×n). In both cases, the image is evaluated at the same position ensemble a in the image domain.

In one embodiment, a decimation strategy is formulated that makes use of migration engine A to evaluate the similarity of two seismic datasets or two vintages in the image domain. Use of a common image domain allows two seismic datasets obtained using different acquisition geometries, e.g., towed-streamer and ocean-bottom data, to be accurately compared without regard to these differences in acquisition geometry or any other issue that makes data domain comparisons difficult. Therefore, exemplary embodiments overcome the difficulties associated with conventional methods.

Considering a stationary part of the seismic dataset, which should be referred to in the following as a "training" dataset, the training set could be chosen in a time window known to correspond with data above the producing reservoir. A characteristic of the training dataset is that there is no 4D signal in it, so the migrated images should be equal if the decimating weights are correct.

A set of decimating weights $w_b$ and $w_m$ are introduced, and these decimating weights should satisfy the following equations:

$$I_{a|b}=A_b w_b d_b \quad (3)$$

and $$I_{a|m}=A_m w_m d_m, \quad (4)$$

where the baseline weights $w_b$ form a diagonal matrix of dimensions (m×m), and the monitor weights $w_m$ form a diagonal matrix of dimensions (n×n). Because these weights operate on the training dataset, then, if the decimating weights are correct, the following equality holds $I_{a|b}=I_{a|m}$.

Thus, an object of the method is to find, by optimization, the set of decimating weights that achieves this equality. To achieve this, it is possible to concatenate (i) the data vectors $d_b$ and $d_m$ into a single vector of length (m+n) and (ii) the weights matrices $w_b$ and $w_m$ into a diagonal matrix of dimensions ([m+n]×[m+n]). Then, inflate the number of columns and zero-pad the migration matrices $A_b$ and $A_m$ such that the finite coefficients of the baseline migration are placed in the first p rows and m columns of $A'_b$, which is (p×[m+n]), and the finite coefficients of the monitor migration are placed in the first p rows and last n columns of $A'_m$, which is also (p×[m+n]). Hence, equations (3) and (4) may be re-written as:

$$I_{a|b}=A'_b wd \quad (5)$$

and $$I_{a|m}=A'_m wd, \quad (6)$$

where $A'_b=[A_b|0_b]$ for a zero-matrix $0_b$ of dimensions (p×n), $A'_m=[0_m|A_m]$ for a zero-matrix $0_m$ of dimensions (p×m), $$w = \begin{bmatrix} w_b & 0'_m \\ 0'_b & w_m \end{bmatrix},$$

for zero-matrices $0'_b$ of dimensions (n×m) and $0'_m$ of dimensions (m×n), $d=[d_b^T|d_m^T]^T$, and operation T means transpose.

Based on equations (5) and (6), a residuals vector r may be formed as follows:

$$r = I_{a|b} - I_{a|m} = A'_b wd - A'_m wd = (A'_b - A'_m)wd. \quad (7)$$

The set of decimating weights may be estimated by minimizing $r^T r$, or by use of some other norm (such as an L1-norm) to minimize the residuals.

The set of decimating weights can be specified to take the values $w=\text{diag}(w_{ii}=0,1)$ for $i=1, \ldots, m+n$. The term $\text{diag}(w_{ii}=0,1)$ means that the matrix is diagonal, so it has values only on the main diagonal and zeros everywhere else. The values that are on the main diagonal can be either 0 or 1, depending on what produces the most similar image. By a weight of 0, that part of the data is not included in the migration. By a weight of 1, the data is included. Other values are also possible, but would make the problem less well conditioned. Furthermore, the weights may be allowed to vary either sample by sample, or to take blocks of values that represent the decimation of entire traces at a time.

The problem of estimating decimating weights by minimizing the residuals vector can be further conditioned by placing various regularizing terms on the weights. For example, the trivial solution of matching two vintages by making all weights zero can be avoided by requiring the set of complementary weights $\tilde{w}_{ii}$ to be $\tilde{w}_{ii}=1,0$ for $w_{ii}=0,1$, and to have minimum total magnitude $\tilde{w}^T \tilde{w}$. Similarly, the weights may be required to be flat (a minimum of the gradient of the weights), which promotes blocks of weights with similar values under the premise that adjacent traces are likely to hold similar information content. Finally, a condition that requires even trace density may be added to promote quality of the 3D migrated image after the image domain 4D-binning.

A few practical details associated with the novel method are now discussed. In one application, the migration matrices are large, being of dimensions (p×[m+n]) for p image points and m+n datapoints in the combined baseline and monitor. Furthermore, the migration matrices are non-sparse because they contain coefficients distributed over the data domain that includes Greens functions of the image points. Thus, the matrices may be too large to produce a solution of the entire datasets in one pass. Nevertheless, by dividing the data into overlapping spatio-temporal blocks, a set of weights may be obtained for each block, and then it is possible to separately decimate the data prior to a final migration.

Before the final migration takes place, further normalizing the data in the overlap zones by their duplication number allows the final images from each block to be summed together. By dividing the data into overlapping spatio-temporal blocks, one trace may be duplicated in the overlap of q blocks. The duplication number for this trace is then q. The process may thus be parallelized in both the image domain (choose small p blocks) and in the data domain (choose small m, n blocks), although one of the domains needs to be large enough to contain the migration operator at a given aperture.

Having determined the set of decimating weights, these can be applied to the data prior to a final migration using an imaging algorithm external to the subsurface 4D-binning process.

Thus, the image domain 4D-binning method improves the 4D match between two surveys with very different acquisition geometries, in particular for towed-streamer and ocean-bottom node data.

Exemplary embodiments link data domain decimation to similarity measures for the common migrated-image domain. In one embodiment, explicit grouping of traces by spatial bin and offset or angle class is not required. In another embodiment, a similarity measure based on surface or data domain trace attributes is not required. Consequently, the method advantageously improves the accuracy of 4D-binning when the input seismic datasets have different acquisition geometries.

Figure 4:
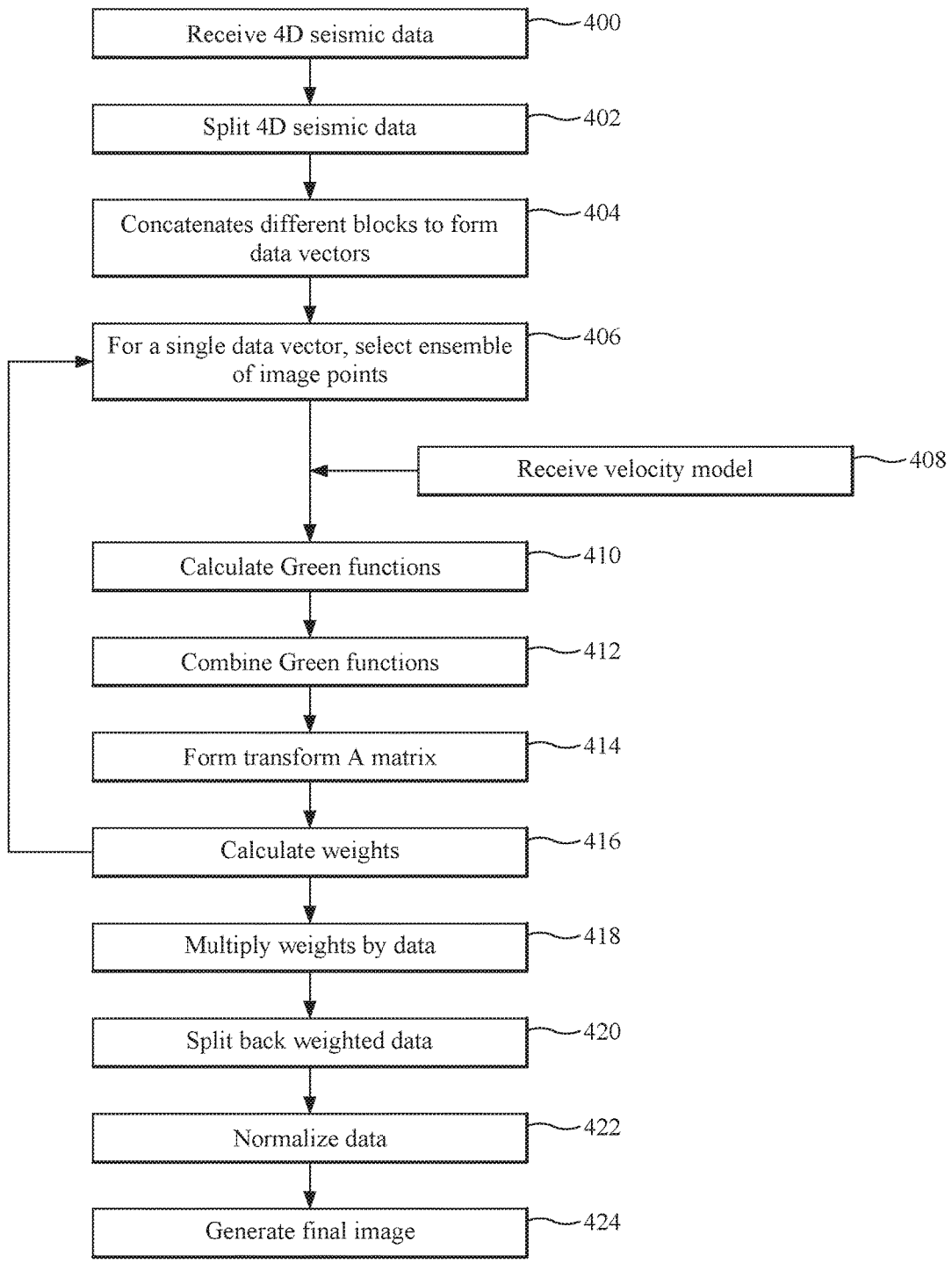
FIG. 4 is a flowchart illustrating a more detailed method for 4D-binning according to an exemplary embodiment.

Referring to FIG. 4, an exemplary embodiment of a 4D-binning algorithm is illustrated. In a first step 400, 4D seismic data are received. The 4D seismic data include two seismic datasets from at least two different 3D seismic surveys. In one application, one seismic dataset has been collected using streamers while a second seismic dataset has been collected using OBNs. The 4D seismic data, i.e., the first or base seismic dataset and the second or monitor dataset, are split 402 into a one or more overlapping spatio-temporal blocks. One block from each seismic dataset is concatenated into a working data vector d of length m+n for m datapoints in the baseline block and n data points in the monitor block 404. Thus, a plurality of data vectors is formed as a result of this process. Next, each data vector is processed separately. Considering the single data vector d, an ensemble of image points is defined for the data vector 406. The ensemble of image points (associated with $I_a$) is defined so that the data vector d is mapped to it by migration A. The image points may or may not be regularly distributed in the image domain. The ensemble of image points may be the same during the entire process or may be chosen for each data block.

Next, a pre-defined velocity model is received 408. The velocity model describes the propagation speed of sound in water and in the subsurface, and this velocity model may be obtained in any suitable way known and available to those skilled in the art. Based on the velocity model, the algorithm calculates (e.g., by ray tracing) Green's functions 410 of seismic waves that propagate from each image point in the ensemble to the position of each source and each receiver in the data vector. The source and receiver Green's functions for each image point in the ensemble are combined 412 to define the coefficients of a Kirchhoff integral in a corresponding row of migration matrices $A'_b$ and $A'_m$. If another migration method is used, then a corresponding quantity is calculated and not the Kirchhoff integral. Having the migration matrices $A'_b$ and $A'_m$, a net transform matrix $A=A'_b-A'_m$ is formed 414. Next, based on the net transform matrix A, the weights w are formed 416.

Figure 5:
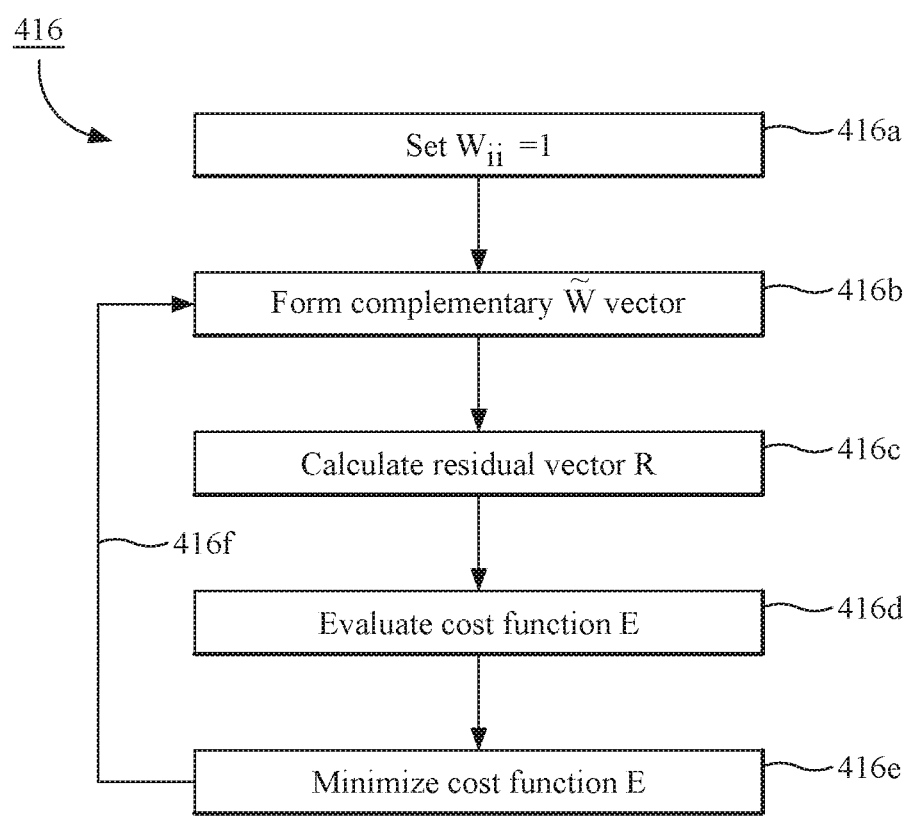
FIG. 5 is a flowchart illustrating a step of the method for 4D-binning of FIG. 4 according to an exemplary embodiment.

Referring to FIG. 5, an embodiment of calculating the weights is illustrated. Overall for calculating weights 416, a vector of weights $w=\text{diag}[w_{ii}]$ is formed for $i=1, \ldots, m+n$. The diagonal elements of the vector are set to be one, i.e., $w_{ii}=1$ 416a. Then, the corresponding vector of complementary weights $\tilde{w}$ is formed 416b so that $\tilde{w}=[\tilde{w}_{ii}=1,0]$ when $w=[w_{ii}=0,1]$ and $i=1, \ldots, m+n$. Note that the notation $\tilde{w}_{ii}=1,0$ means a diagonal element of the vector w takes a value one or zero, and all other elements of the vector take a zero value. The residuals vector r is calculated 416c based on formula $r=Awd$. A cost function E is defined and then evaluated 416d based on formula $E=r^T r + \tilde{w}^T \tilde{w}$. Note that additional terms may be added to the cost function to promote, for example, flatness in the spatial trace density, or to improve the quality of the 3D migrated images.

Cost function E is minimized with respect to the set of weights 416e using various mathematical methods. For example, minimization of the cost function may be achieved using the method of conjugate gradients applied to the vector of weights w. In one embodiment, the algorithm loops back from sub-step 416f to sub-step 416b until the cost function is minimized. Note that the set of weights may be varied at each step and thus, complementary weights need to be re-calculated in each step. Once the cost function has been minimized, the vector of weights that minimizes the cost function for the given data d is obtained. Then, the algorithm returns to step 406 to address the next vector of data until all data is processed.

Returning to FIG. 4, the vector of weights w for all data d is multiplied 418 by the vector of data d and then the weighted data vector is split back 420 into the spatio-temporal blocks of step 402. Following this, data are normalized in the overlap zones of the blocks by their duplication number 422. After one or more processing steps, the final image of the surveyed subsurface is generated 424.

Figure 6:
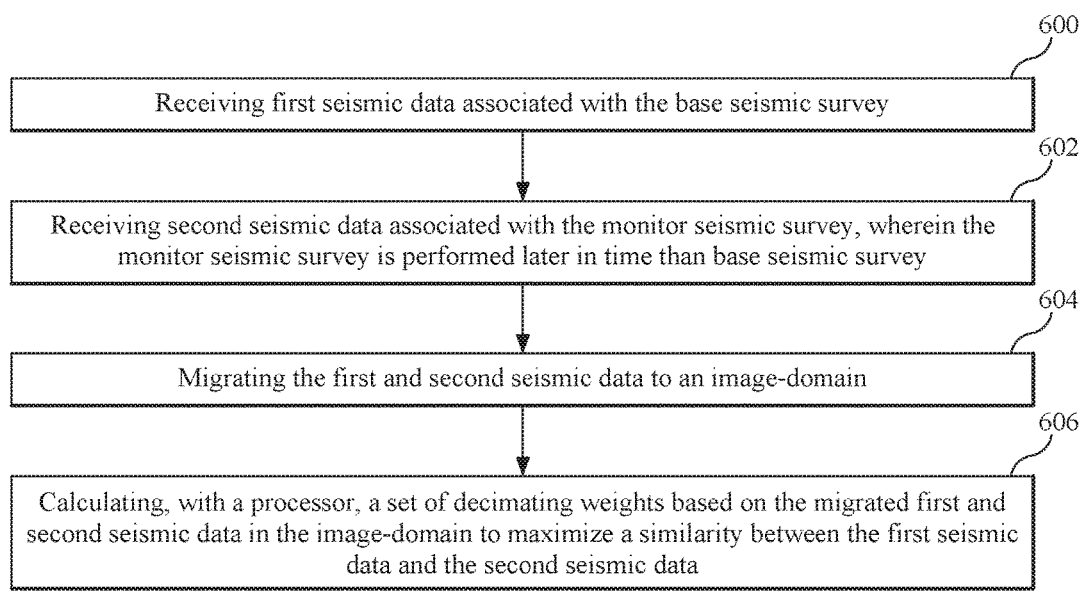
FIG. 6 is a flowchart illustrating a method for 4D-binning according to an exemplary embodiment.

Referring to FIG. 6, an exemplary embodiment of a method for increasing a similarity between a first seismic dataset, for example from base seismic survey, and a second seismic dataset, for example from a monitor seismic survey of a same surveyed subsurface during a 4-dimensional (4D) project is illustrated. A first seismic dataset associated with the base seismic survey is obtained or received 600, and a second seismic dataset associated with the monitor seismic survey is also received 602. The monitor seismic survey is performed later in time than the base seismic survey. The first and second seismic datasets are migrated an image domain 604. Using a processor, a vector of decimating weights is calculated based on the migrated first and second seismic datasets in the image domain to maximize a similarity between the first seismic dataset and the second seismic dataset 606.

Figure 7:
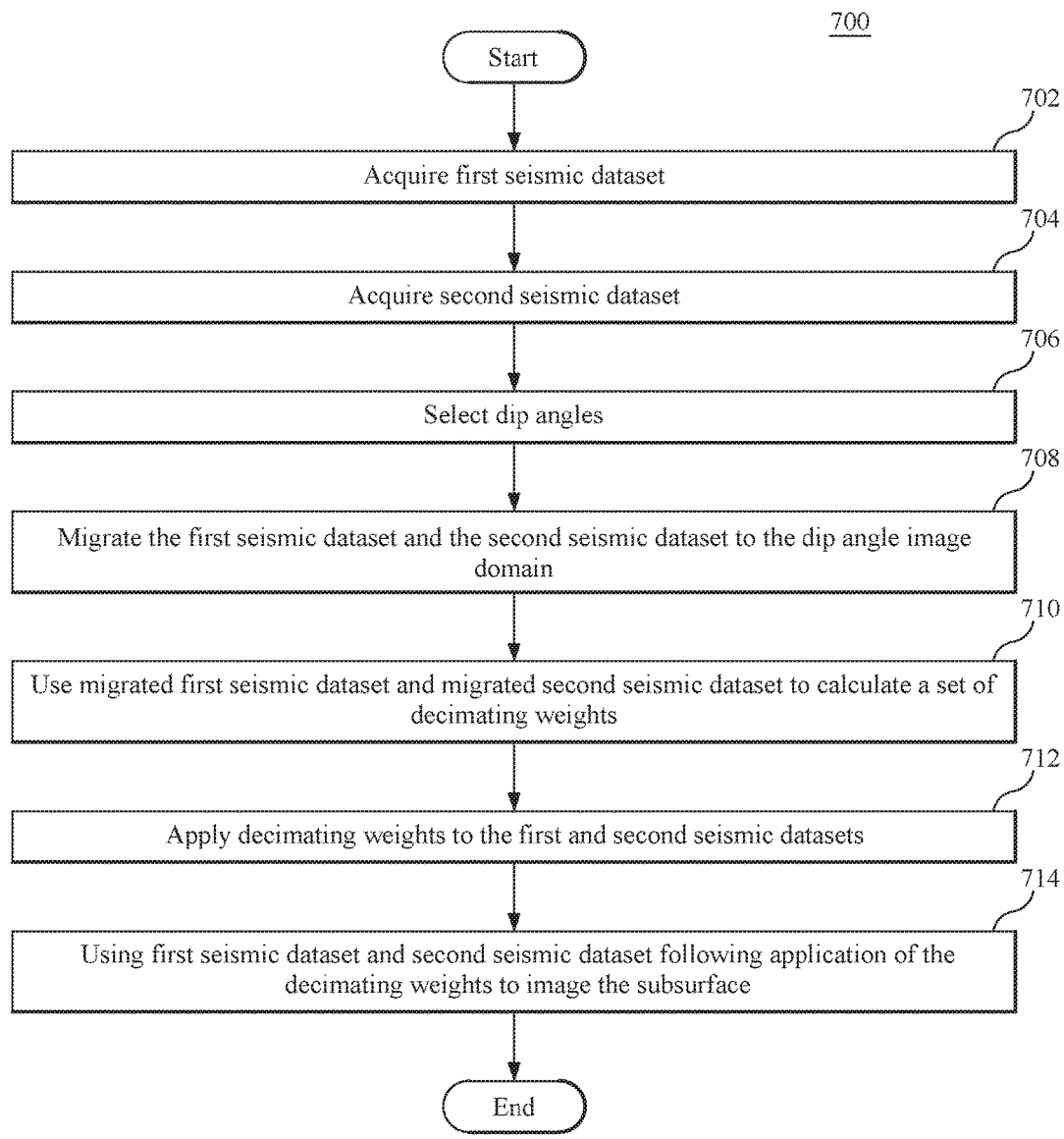
FIG. 7 is a flowchart illustrating another method for 4D-binning according to an exemplary embodiment.

Referring to FIG. 7, another exemplary embodiment of a method for increasing the similarity between a first seismic dataset and a second seismic dataset from at least one seismic survey of a subsurface 700 is illustrated. In accordance with this embodiment, the seismic datasets are migrated to a dip-angle image domain, which is defined as a sub-class of the more general image domain. In the dip angle image domain, components of the migrated image are separated to a set of different partial images based on the reflector dip being imaged.

The first seismic dataset is obtained 702, for example from a database or from a seismic acquisition survey. The first seismic dataset includes a plurality of first seismic traces obtained, for example, from a base seismic survey. The second seismic dataset is acquired 704, for example from a database or from a seismic acquisition survey. The second seismic dataset includes a plurality of second seismic traces obtained, for example, from a monitor seismic survey conducted after the base seismic survey.

Each one of the first and second seismic datasets are migrated in the dip angle domain. This can be achieved by migrating the seismic datasets to multiple partial images, where each image is associated with a given dip angle or range of dip angle, for example, for dips located within the subsurface. Therefore, in one embodiment, a plurality of dip angles is selected 706. In general, high and very high dips are necessary to image punctual structure, edges or diffractors. On the contrary, in case of more or less flat and horizontal structures, using higher dips results in migration noise increase. Therefore, the dip selection for a three-dimensional (3D) subsurface is applied to 4D migration processing.

In accordance with one embodiment, anti-aliasing is utilized to optimize dip selection. Therefore, a plurality of frequency bands is selected or identified in the first and second seismic datasets, and a dip angle is associated with each one of the plurality of frequency bands. The lower frequencies are associated with larger dip angles, and higher frequencies are associated with smaller dip angles. In 3D imaging, aliasing increases with the frequency and with the migration dip. One technique for compensating for the effects of aliasing separates the initial traces into a plurality, N, of bandwidths and migrates the N different bandwidths with different dips. The N per-bandwidths migrated sections are then added together.

Adapting the anti-aliasing technique to 4D focuses the 4D seismic data. This focusing is increased by using higher frequencies and higher dips. Regarding dip, the choice is performed in relation to the 4D events at depth within the subsurface. For example, if the subsurface medium is a layered and horizontal medium, optimal dips for 3D imaging can be low, e.g., 10 to 15 degrees. In 4D, an event occurring in the reservoir can be punctual or sharply terminated in location, for example, when steam injection starts. Therefore, these events in 4D are better imaged with higher dips, e.g., up to 40 degrees or more. In many cases, 4D events can present dips significantly different compared to 3D structures. Therefore, exemplary embodiments, when performing anti-aliasing in dip angle selection choose dips that are not optimized for 3D imaging but for 4D attributes. As illustrated in Table 1, lower dip angles are associated with higher frequencies in order to benefit from more high frequencies (anti-alias), and higher dip angles are associated with lower frequencies to better focus the 4D event.

TABLE 1

Anti-Aliased Migration Adapted For 4D

| | Frequency sub-band | | |
|---|---|---|---|
| | [10 50] Hz | [50 110] Hz | [110 200] Hz |
| Optimal dip | 35° | 23° | 12° |

In one embodiment of using the anti-aliasing techniques in 4D, the plurality of frequency bands are selected in the seismic datasets, and a desired or optimal dip angle is selected for each one of the frequency bands. Each one of the first and second seismic datasets are then separately migrated into the partial dip angle images of the dip angles in accordance with these frequency bands. The result is a plurality of partial images for each seismic data set. These plurality of partial images can then be used in additional 4D processing with or without summing Another embodiment of dip angle selection utilizes dip angle filtering. The optimal choice of dip angle can be done using dip filtering. In this embodiment, a smallest dip angle is identified and is greater than zero, $\delta_1 > 0$, and a largest dip angle, $\delta_2$, is identified that is less than a maximum dip angle in the subsurface. In the plurality of dip angles, the selected dip angle are located between the smallest dip angle and the largest dip angle, $\delta_2 > \delta_1$. While migration with dip ranging from $\delta_1 > 0$ to $\delta_2 > \delta_1$ may not produce a real 3D image, 4D seismic data can largely present a certain dip and can be better isolated using dip filtering. Therefore, dip filtering brings additional information to detect reservoir activity.

In this embodiment, a plurality of dips ranges is selected, each one of the first and second seismic datasets are migrated into each one of the plurality of ranges. This results in a plurality of dip angle image domain partial images for each seismic dataset. Each partial image is associated with a given dip angle or range of dip angles. These partial dip angle images are then used for additional 4D processing and subsurface imaging. This embodiment can be used to compute attributes on migration preformed with dip sub-ranges or to optimize dip at depth of interest before any type migration or processing using migration.

Having selected the dip angles for migration, the first seismic dataset and second seismic dataset are migrated to a dip angle image domain 708. Any suitable method for migrating seismic data known and available in the art can be used. As the first and second seismic datasets contain a plurality of seismic traces, a subset of the first seismic traces and a subset of the second seismic traces are selected. The subset of first seismic traces and the subset of second seismic traces are then migrated. In one embodiment, different subsets of the seismic traces are iteratively selected and processed for similarity.

In one embodiment, the first seismic dataset is migrated to a plurality of first seismic dataset dip angle partial images, and the second seismic dataset is migrated to a plurality of second seismic dataset dip angle partial images. Each first seismic dataset and second seismic dataset dip angle partial image is associated with one of a plurality of selected dip angles. In one embodiment, this separation into partial dip-angle images is achieved using the slowness vectors of the source-side and receiver-side rays propagated from the acquisition surfaces to the image point. The sum of these slowness vectors is the illumination slowness vector that is normal to the reflector being imaged as described, for example, in Audebert, F. et al., "Migration In The Angle Domain, An Inside View", EAGE 65th Conference & Exhibition (2003). Using the illumination slowness vector it is possible to separate the image into component parts based on the geological dip of the reflectors, Klokov. A. and Fomel. S., "Selecting An Optimal Aperture In Kirchhoff Migration Using Dip-Angle Gathers", Geophysics, v 78, (2013) and Resher, M. and Landa, E., "Post-Stack Velocity Analysis In The Dip-Angle Domain Using Diffractions", Geophysical Prospecting, v57, (2009).

The migrated first seismic dataset and the migrated second seismic dataset in the dip angle image domain are used to calculate a set of decimating weights 710. These decimating weights are to be applied to the first seismic dataset and the second seismic dataset to maximize a similarity between the first seismic dataset and the second seismic dataset. In particular, the set of decimating weights is calculated to be applied to the first seismic dataset and the second seismic dataset in the dip angle image domain, as opposed to the data domain. The set of decimating weights can be a set of analogue weights or a set of binary weights, (0,1), that are applied or multiplied to the seismic datasets to suppress or eliminate those portions of the seismic datasets that do not contribute to the similarity of those datasets in the dip angle image domain. For example, the weights are applied to the individual seismic traces in each of the seismic datasets.

Similarity is determined between pairs of dip angle partial images associated with a common dip angle. One of the dip angle partial images in the pair of images is associated with the first seismic dataset, and the other dip angle partial image in the pair of images is associated with the second seismic dataset. In one embodiment, a measure of similarity between a first seismic dataset dip angle partial image and a second seismic dataset dip angle partial image is determined for each pair of dip angle partial images associated with a common one of the plurality of dip angles. Suitable measures of similarity include, but are not limited to, a point by point measure of similarity. In one embodiment, a set of decimating weights for the first seismic dataset dip angle partial image and the second seismic dataset dip angle partial image in each pair of dip angle partial images is calculated. Each set of decimating weights when multiplied to the first seismic dataset dip angle partial image and the second seismic dataset dip angle partial image in a given pair of dip angle partial images increases a similarity of the first seismic dataset dip angle partial image and the second seismic dataset dip angle partial image in that given pair of dip angle partial images.

Having generated the set of decimating weights, these decimated weights are applied to the first seismic dataset and the second seismic dataset 712. In one embodiment, each set of decimating weights is multiplied to the first seismic dataset dip angle partial image and the second seismic dataset dip angle partial image in the pair of dip angle partial images associated with that set of decimating weights. An image of the subsurface is generated using the first seismic dataset and the second seismic dataset following application of the decimated weights 714. In one embodiment, the first seismic dataset dip angle partial image and the second seismic dataset dip angle partial image in each pair of dip angle partial images following multiplication are combined to produce an image of the subsurface.

The produced image can then be output, i.e., displayed to a user, or saved, and can be used to analyze past reservoir production and guide future reservoir production. In accordance with exemplary embodiments, the dip angle domain is included in the scope of the claims as a sub-class of image domain, and the set of decimating weights are applied in the image domain and not in the data domain. Dip angle decomposition ensures the first and second seismic datasets are transformed to a common domain, i.e., the depth domain, in a form suitable for high-quality similarity-enhancing processing with dip decomposition. This is particularly useful for mixed-geometry 4D surveys, such as a towed-streamer baseline and an OBN monitor survey, which do not otherwise provide a common domain in which to conduct similarity-enhancing processes with these datasets.

In addition to the increased similarity of baseline and monitor images on reflecting interfaces, the use of dip-angle images for similarity processing allows the detection and removal of coherent noise such as remnant multiple, seismic interference, backscattered energy and other sources of noise resent in either one of the baseline or monitor.

Figure 8:
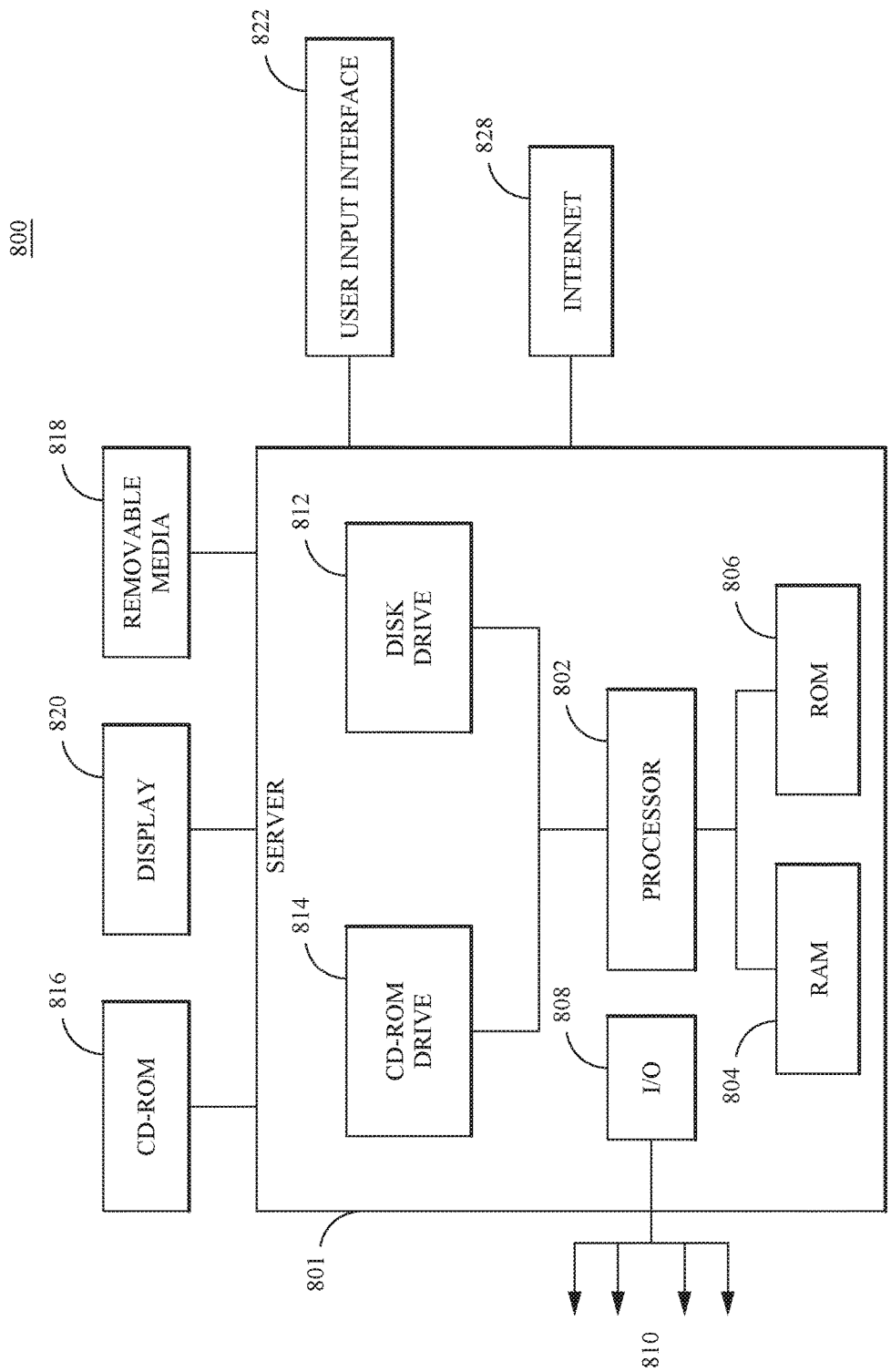
FIG. 8 is a schematic diagram of a computing device for implementing the above methods.

Referring to FIG. 8, an embodiment of a representative computing device 800 capable of carrying out operations in accordance with the exemplary embodiments is illustrated. Hardware, firmware, software or a combination thereof may be used to perform the various steps and operations described herein.

The exemplary computer device 800 suitable for performing the activities described in the exemplary embodiments may include server 801. Such a server 801 may include a central processor unit (CPU) 802 or processor coupled to and in communication with a database such as s random access memory (RAM) 804 and to a read-only memory (ROM) 806. ROM 806 may also be other types of storage media to store programs, such as programmable ROM (PROM), erasable PROM (EPROM), etc. Processor 802 may communicate with other internal and external components through input/output (I/O) circuitry 808 and bussing 810 to provide control signals and the like. Processor 802 carries out a variety of functions as are known in the art, as dictated by software and/or firmware instructions.

In one embodiment, the databased stores the first seismic dataset and the second seismic dataset. The processor, which is in communication with the database is configured to migrate the first seismic dataset and second seismic dataset to a dip angle image domain and to use the migrated first seismic dataset and the migrated second seismic dataset in the dip angle image domain to calculate a set of decimating weights to be applied to the first seismic dataset and the second seismic dataset to maximize a similarity between the first seismic dataset and the second seismic dataset.

In one embodiment, the processor is further configured to migrate the first seismic dataset to a plurality of first seismic dataset dip angle partial images and the second seismic dataset to a plurality of second seismic dataset dip angle partial images. Each first seismic dataset and second seismic dataset dip angle partial image is associated with one of a plurality of dip angles. In one embodiment, the processor is further configured to determine a measure of similarity between a first seismic dataset dip angle partial image and a second seismic dataset dip angle partial image for each pair of dip angle partial images associated with a common one of the plurality of dip angles. Suitable measures of similarity include, but are not limited to, a point by point measure of similarity. In one embodiment, the processor is further configured to calculate a set of decimating weights for the first seismic dataset dip angle partial image and the second seismic dataset dip angle partial image in each pair of dip angle partial images. Each set of decimating weights when multiplied to the first seismic dataset dip angle partial image and the second seismic dataset dip angle partial image in a given pair of dip angle partial images increases a similarity of the first seismic dataset dip angle partial image and the second seismic dataset dip angle partial image in that given pair of dip angle partial images.

In one embodiment, the processor is further configured to multiply each set of decimating weights to the first seismic dataset dip angle partial image and the second seismic dataset dip angle partial image in the pair of dip angle partial images associated with that set of decimating weights and to combine the first seismic dataset dip angle partial image and the second seismic dataset dip angle partial image in each pair of dip angle partial images following multiplication to produce an image of the subsurface.

Server 801 may also include one or more data storage devices, including hard disk drives 812, CD-ROM drives 814, and other hardware capable of reading and/or storing information such as a DVD, etc. In one embodiment, software for carrying out the above-discussed steps may be stored and distributed on a CD-ROM or DVD 816, removable media 818 or other forms of media capable of portably storing information. These storage media may be inserted into, and read by, devices such as the CD-ROM drive 814, the drive 812, etc. Server 801 may be coupled to a display 820, which may be any type of known display or presentation screen, such as LCD or LED displays, plasma displays, cathode ray tubes (CRT), etc. A user input interface 822 is provided, including one or more user interface mechanisms such as a mouse, keyboard, microphone, touch pad, touch screen, voice-recognition system, etc.

Server 801 may be coupled to other computing devices via a network. The server may be part of a larger network configuration as in a global area network (GAN) such as the Internet 828.

As also will be appreciated by one skilled in the art, the exemplary embodiments may be embodied in a wireless communication device, a telecommunication network, as a method or in a computer program product. Accordingly, the exemplary embodiments may take the form of an entirely hardware embodiment or an embodiment combining hardware and software aspects. Further, the exemplary embodiments may take the form of a computer program product stored on a computer-readable storage medium having computer-readable instructions embodied in the medium. Any suitable computer-readable medium may be utilized, including hard disks, CD-ROMs, digital versatile discs (DVD), optical storage devices, or magnetic storage devices such as floppy disk or magnetic tape. Other non-limiting examples of computer-readable media include flash-type memories or other known types of memories.

The disclosed exemplary embodiments provide an apparatus and a method for increasing similarity between a first seismic dataset and a second seismic dataset from at least one seismic survey of a subsurface. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for seismic monitoring of a subsurface including an oil and/or gas reservoir, the method comprising:
   obtaining the first seismic dataset acquired during a base seismic survey of the subsurface;
   obtaining the second seismic dataset acquired during a monitor seismic survey of the subsurface conducted after the base seismic survey;
   migrating the first seismic dataset and the second seismic dataset to a dip angle image domain;
   using the migrated first seismic dataset and the migrated second seismic dataset in the dip angle image domain to calculate, with a processor, a set of decimating weights which, when applied to the first seismic dataset and the second seismic dataset, maximize a similarity between the first seismic dataset and the second seismic dataset;
   applying the set of decimating weights to the first seismic dataset and the second seismic dataset; and
   generating an image of changes in the subsurface using the first seismic dataset and the second seismic dataset following application of the decimating weights.

2. The method of claim 1, wherein the first seismic dataset comprises first seismic traces and the second seismic dataset comprises second seismic traces, the method further comprising:
   selecting a subset of the first seismic traces and a subset of the second seismic traces; and
   the migrating of the first seismic dataset and of the second seismic dataset includes migrating the subset of first seismic traces and the subset of second seismic traces.

3. The method of claim 1, wherein the set of decimating weights is applied to the first seismic dataset and the second seismic dataset in the dip angle image domain.

4. The method of claim 1, wherein the migrating of the first seismic dataset and of the second seismic dataset to the dip angle image domain comprises:
selecting a plurality of dip angles; and
migrating the first seismic dataset to a plurality of first seismic dataset dip angle partial images and the second seismic dataset to a plurality of second seismic dataset dip angle partial images, each first seismic dataset dip angle partial image and a corresponding second seismic dataset dip angle partial image being associated with one dip angle in the plurality of dip angles.

5. The method of claim 4, wherein the using of the migrated first seismic dataset and the migrated second seismic dataset in the dip angle image domain to calculate the set of decimating weights comprises determining a measure of similarity between a first seismic dataset dip angle partial image and a second seismic dataset dip angle partial image for each pair of dip angle partial images associated with a common one of the plurality of dip angles.

6. The method of claim 5, wherein the measure of similarity comprises a point by point measure of similarity.

7. The method of claim 5, wherein the using of the migrated first seismic dataset and the migrated second seismic dataset in the dip angle image domain to calculate the set of decimating weights further comprises calculating a subset of decimating weights for the first seismic dataset dip angle partial image and the second seismic dataset dip angle partial image in each pair of dip angle partial images.

8. The method of claim 7, wherein each subset of decimating weights when multiplied to the first seismic dataset dip angle partial image and the second seismic dataset dip angle partial image in a given pair of dip angle partial images increase a similarity of the first seismic dataset dip angle partial image and the second seismic dataset dip angle partial image in that given pair of dip angle partial images.

9. The method of claim 8, wherein the method further comprises:
multiplying each subset of decimating weights to the first seismic dataset dip angle partial image and the second seismic dataset dip angle partial image in the respective pair of dip angle partial images associated with that subset of decimating weights; and
combining a resulting weighted first seismic dataset dip angle partial image and a resulting weighted second seismic dataset dip angle partial image in each pair of dip angle partial images following multiplication to produce an image of the subsurface.

10. The method of claim 4, wherein the selecting of the plurality of dip angles includes:
identifying a plurality of frequency bands in the first and second seismic datasets; and
associating a dip angle with each one of the plurality of frequency bands, wherein lower frequencies are associated with larger dip angles and higher frequencies are associated with smaller dip angles.

11. The method of claim 4, wherein the selecting of the plurality of dip angles includes:
identifying a smallest dip angle, the smallest dip angle being greater than zero;
identifying a largest dip angle, the largest dip angle being less than a maximum dip angle in the subsurface; and
selecting the plurality of dip angles between the smallest dip angle and the largest dip angle.

12. A computing device for seismic monitoring of a subsurface including an oil and/or gas reservoir, the computing device comprising:
a database comprising the first seismic dataset acquired during a base seismic survey of the subsurface and the second seismic dataset acquired during a monitor seismic survey conducted after the base seismic survey; and
a processor in communication with the database and configured to:
migrate the first seismic dataset and second seismic dataset to a dip angle image domain;
use the migrated first seismic dataset and the migrated second seismic dataset in the dip angle image domain to calculate a set of decimating weights which, when applied to the first seismic dataset and the second seismic dataset, maximize a similarity between the first seismic dataset and the second seismic dataset;
apply the set of decimating weights to the first seismic dataset and the second seismic dataset; and
generate an image of changes in the subsurface using the first seismic dataset and the second seismic dataset following application of the decimating weights.

13. The computing device of claim 12, wherein the processor is further configured to:
select a plurality of dip angles; and
migrate the first seismic dataset to a plurality of first seismic dataset dip angle partial images and the second seismic dataset to a plurality of second seismic dataset dip angle partial images, each first seismic dataset dip angle partial image and a corresponding second seismic dataset dip angle partial image being associated with one dip angle in the plurality of dip angles.

14. The computing device of claim 13, wherein the processor is further configured to determine a measure of similarity between a first seismic dataset dip angle partial image and a second seismic dataset dip angle partial image for each pair of dip angle partial images associated with a common one of the plurality of dip angles.

15. The computing device of claim 14, wherein the measure of similarity comprises a point by point measure of similarity.

16. The computing device of claim 14, wherein the processor is further configured to calculate a subset of decimating weights for the first seismic dataset dip angle partial image and the second seismic dataset dip angle partial image in each pair of dip angle partial images.

17. The computing device of claim 16, wherein each subset of decimating weights when multiplied to the first seismic dataset dip angle partial image and the second seismic dataset dip angle partial image in a given pair of dip angle partial images increase a similarity of the first seismic dataset dip angle partial image and the second seismic dataset dip angle partial image in that given pair of dip angle partial images.

18. The computing device of claim 17, wherein the processor is further configured to:
multiply each subset of decimating weights to the first seismic dataset dip angle partial image and the second seismic dataset dip angle partial image in the respective pair of dip angle partial images associated with that subset of decimating weights; and
combine a resulting weighted first seismic dataset dip angle partial image and a resulting weighted second seismic dataset dip angle partial image in each pair of dip angle partial images following multiplication to produce an image of the subsurface.

19. A non-transitory computer readable medium including computer executable instructions, wherein the instructions, when executed by a computer, implement a method for seismic monitoring of a subsurface including an oil and/or gas reservoir, the method comprising:

obtaining the first seismic dataset acquired during a base seismic survey of the subsurface;

obtaining the second seismic dataset acquired during a monitor seismic survey of the subsurface conducted after the base seismic survey;

migrating the first seismic dataset and second seismic dataset to a dip angle image domain;

using the migrated first seismic dataset and the migrated second seismic dataset in the dip angle image domain to calculate, with a processor, a set of decimating weights which, when applied to the first seismic dataset and the second seismic dataset, maximize a similarity between the first seismic dataset and the second seismic dataset;

applying the set of decimating weights to the first seismic dataset and the second seismic dataset; and generating an image of changes in the subsurface using the first seismic dataset and the second seismic dataset following application of the decimating weights.

* * * * *